(12) United States Patent
Mouton et al.

(10) Patent No.: US 11,477,169 B1
(45) Date of Patent: Oct. 18, 2022

(54) METHOD OF SECURELY TRANSMITTING A MESSAGE VIA A TELECOMMUNICATIONS NETWORK

(71) Applicant: Syniverse Technologies, LLC, Tampa, FL (US)

(72) Inventors: Jacques F. Mouton, Tampa, FL (US); Monique Jeanne Morrow, Zurich (CH)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/582,386

(22) Filed: Jan. 24, 2022

(51) Int. Cl.
*H04L 9/40* (2022.01)
(52) U.S. Cl.
CPC ...... *H04L 63/0421* (2013.01); *H04L 63/0428* (2013.01)
(58) Field of Classification Search
CPC ............ H04L 63/0421; H04L 63/0428
See application file for complete search history.

(56) References Cited

U.S. PATENT DOCUMENTS

| | | | |
|---|---|---|---|
| 7,921,292 B1* | 4/2011 | Pauker | H04L 9/321 713/171 |
| 8,948,375 B2 | 2/2015 | Burnett et al. | |
| 8,954,605 B1* | 2/2015 | Hecht | H04L 51/18 709/219 |
| 9,729,424 B2* | 8/2017 | Yin | H04L 41/0823 |
| 2008/0043937 A1* | 2/2008 | Qian | H04M 1/2478 379/67.1 |
| 2013/0124757 A1* | 5/2013 | Norrman | H04L 63/06 709/242 |
| 2014/0123237 A1* | 5/2014 | Gaudet | H04L 67/06 726/4 |
| 2016/0094493 A1* | 3/2016 | Liu | H04L 51/046 709/206 |

OTHER PUBLICATIONS https://www.pcmag.com/encyclopedia/term/embed retrieved Jun. 2, 2022.

* cited by examiner

*Primary Examiner* — Linglan Edwards
(74) *Attorney, Agent, or Firm* — Andriy Lytvyn; Smith & Hopen, P.A.

(57) ABSTRACT

A method of securely transmitting a message from a sending entity to a receiving entity via a network. A Processing String Engine is communicatively coupled to the sending and receiving entities. The sending entity requests the Processing String Engine to provide a network routing path for message transmission from the sending entity to the receiving entity and to provide a processing string for the message transmission. The Processing String Engine identifies a network path and generates a processing string. The sending entity appends the processing string to the message and sends the message to the receiving entity. The message is unreadable while the processing string is appended thereto. Upon receipt of the message with the appended processing string, the receiving entity requests removal the processing string. Upon successful verification of the receiving entity, the processing string is removed, and the message is returned to the receiving entity.

20 Claims, 7 Drawing Sheets

METHOD OF SECURELY TRANSMITTING A MESSAGE VIA A TELECOMMUNICATIONS NETWORK

BACKGROUND OF THE INVENTION

1. Field of the Invention

This invention relates generally to the field of telecommunication and computer networking. More specifically, the invention pertains to a method of securely transmitting a message from a sending entity to a receiving entity via a computer network.

2. Brief Description of the Related Art

Proprietary network information is a source of vulnerability for entities operating in the technology space, and sharing of this information poses technical, strategic, and competitive risks for organizations. Leakage of proprietary network information can occur not only when there is a central database managed by a single entity, but also when third parties need to communicate, without sharing proprietary network information. An example may be in the distributed ledger technology space where there is a bilateral relationship between two parties belonging to two different entities, and the information exchanged in a channel cannot be deemed as proprietary by either party. Furthermore, in a managed cloud service, network leakage may occur when sensitive information stored in a private cloud instance is accidentally leaked to the Internet or when a supplier exposes information unnecessarily.

Accordingly, there is a strong and unfulfilled need for a method of concealing proprietary network information and message content when transmitting a message from a sending entity to a receiving entity via a computer network.

SUMMARY OF THE INVENTION

The present invention provides a novel and non-obvious solution to the problem stated above. In an embodiment, the invention pertains to a method of securely transmitting a message from a sending entity to a receiving entity. To ensure secure and anonymized transmission of the message a Processing String Engine is provided, which may be hosted on one or more servers. As used herein, the term "Processing String Engine" refers to a software application configured to be executed by a computer processor, a special-purpose hardware programmed with software and/or firmware, or a combination of special-purpose and programmable circuitry. The sending entity and the receiving entity are communicatively coupled to the Processing String Engine, wherein the connection can be real-time.

The sending entity initiates the process of transmitting a message by sending a request to the Processing String Engine. The Processing String Engine determines a network routing path from the sending entity to the receiving entity and generates a processing string for the message transmission. The processing string comprises one or more alphanumeric strings associated with one or more parameters, which may include the following: an origination location of the message, a sender tag associated with the sending entity, the network routing path, a receiver tag associated with the receiving entity, and a destination location of the message. The Processing String Engine transmits the processing string and the network routing path information to the sending entity.

Next, the sending entity appends the processing string to the message and sends the message with the processing string appended thereto to the receiving entity via the network routing path provided by the Processing String Engine. When the receiving entity receives the message, it cannot immediately access the content of the message while the processing string is appended thereto. To remove the processing string, the receiving entity sends a request to the Processing String Engine. Upon receipt of a request to remove the processing string from the message, the Processing String Engine verifies that the identity of the entity requesting removal of the processing string corresponds to the receiver identity encoded in the receiver tag within the processing string. If the verification is successful, the Processing String Engine removes the processing string from the message and transmits the message (without the processing string) to the receiving entity. At this point, the receiving entity can access the content of the message. Otherwise, if the Processing String Engine determines that the identity of the entity requesting removal of the processing string does not correspond to the identity of the receiving entity identified in the receiver tag of the processing string, the Processing String Engine will send a fraud alert to the sending entity.

The transmission of the message from the sending entity to the receiving entity is secure because, when the processing string is appended to the message, content of the message is unreadable. Thus, even if the message with the appended processing string were intercepted, the intercepting entity would not be able to access the content of the message. Furthermore, because the alphanumeric tags within the processing string conceal network information including the identities and locations of the sending and receiving entities, the message transmission is anonymized.

To further enhance security and anonymization of the message transmission, the Processing String Engine may be configured to change alphanumeric strings for the origination location and the destination location tags for the sending and receiving entities after expiration of a predefined duration. In an embodiment, after the expiration of this predefined duration, the alphanumeric string that has been previously used to identify the origination location or the destination location is never used again. Furthermore, the processing string is unique for every message transmission.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1A:
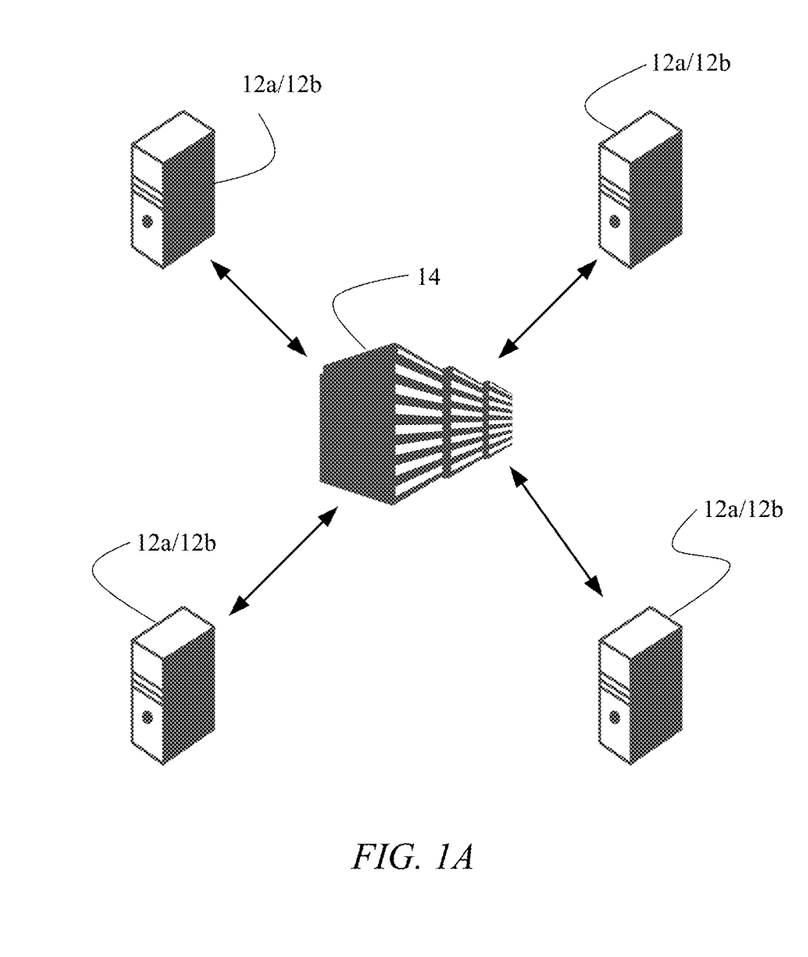
FIG. 1A is a diagram schematically depicting a plurality of sending/receiving entities communicatively coupled to a Processing String Engine.

Embodiments of the present invention pertain to a method of securely transmitting messages from a sending entity to a receiving entity. As used herein, the term "message" encompasses an electronic document, an electronic file, or any other type of digital data or a digital object. FIG. 1A schematically depicts a network in which multiple sending/receiving entities 12a/12b have real-time connections to a Processing String Engine 14. As used herein, the term "Processing String Engine" refers to a software application configured to be executed by a computer processor, a special-purpose hardware programmed with software and/or firmware, or a combination of special-purpose and programmable circuitry. Hence, embodiments may include a machine-readable medium having stored thereon instructions which may be used to program a computer (or other electronic devices) to perform a process. In an embodiment, Processing String Engine 14 may be hosted on a server, which may have real-time network connections with sending/receiving entities 12a/12b.

Figure 1B:
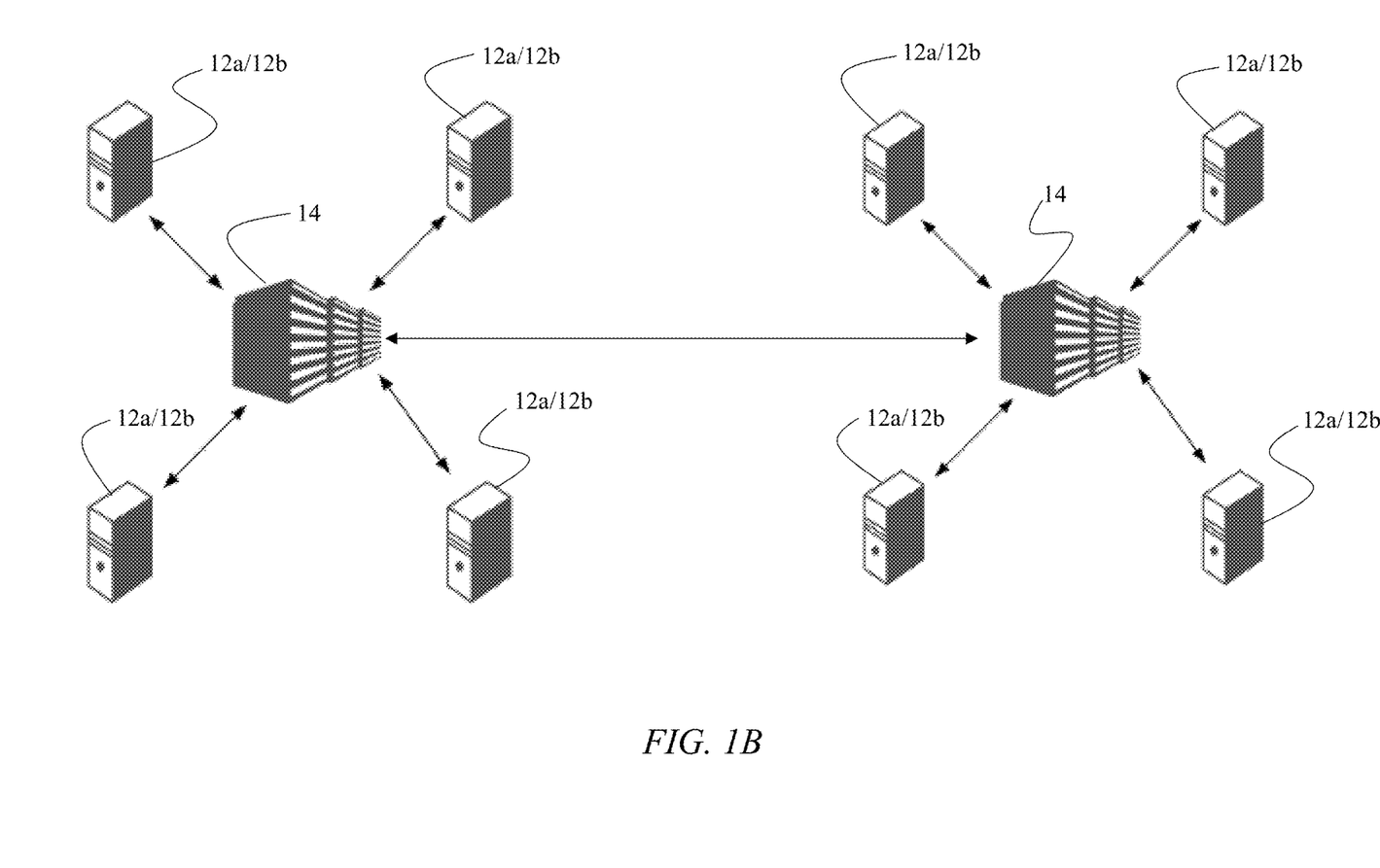
FIG. 1B is a diagram schematically depicting an embodiment in which multiple instances of the Processing String Engine are hosted on servers located in different geographic locations.

FIG. 1B depicts that multiple Processing String Engines 14 may be located in different geographic regions and may have a real-time connection with one another. In this manner, sending/receiving entities 12a/12b can communicate with a proximally located Processing String Engine 14, thereby addressing a third-party hop leakage issue. As disclosed in more detail below, a sending entity 12a must communicate with Processing String Engine 14 to initiate transmission of a message, while a receiving entity 12b must communicate with Processing String Engine 14 after receiving the message. In the embodiment depicted in FIG. 1B sending entity 12a and receiving entity 12b can communicate with two different instances of Processing String Engine 14, hosted on servers proximal to their respective geographic locations.

Figure 2:
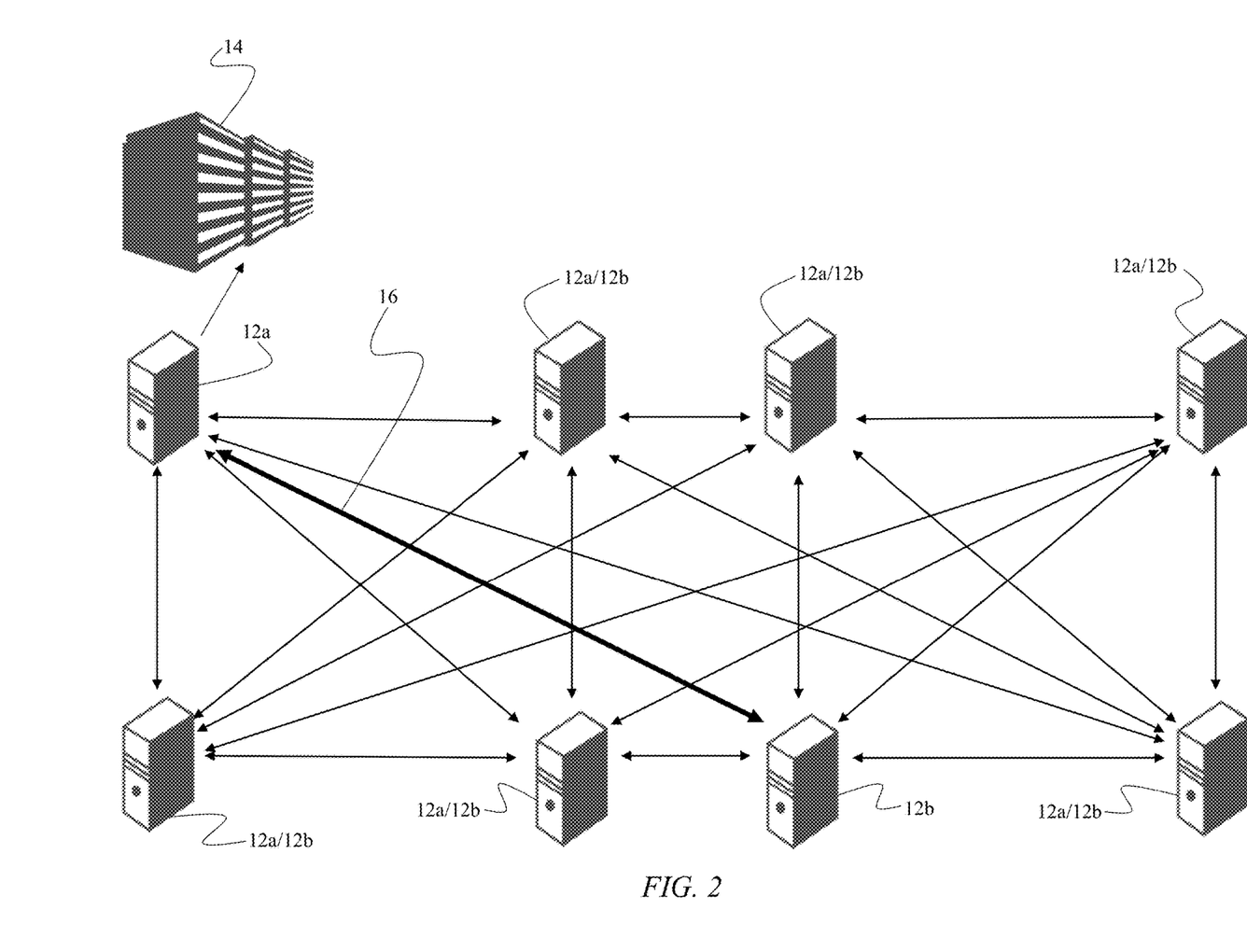
FIG. 2 is a diagram schematically depicting a network of a plurality of sending/receiving entities, wherein the Processing String Engine identifies a routing path from a sending entity to a receiving entity.

FIG. 2 depicts an exemplary network of sending/receiving entities 12a/12b, wherein there is a plurality of routing paths that may be used to transmit messages therebetween. Each message transmission from a sending entity 12a to a receiving entity 12b requires that the message being transmitted must have a processing string appended thereto.

In an embodiment, sending entity 12a initiates the process of securely transmitting a message by sending a request to Processing String Engine 14 to transmit a message to a receiving entity 12b. In response to this request, Processing String Engine 14 identifies an available network routing path 16 for the message transmission from sending entity 12a to receiving entity 12b. Network routing path 16 may be selected based on a plurality of criteria, including transmission safety, distance, directness, speed, and reliability.

Figure 3:
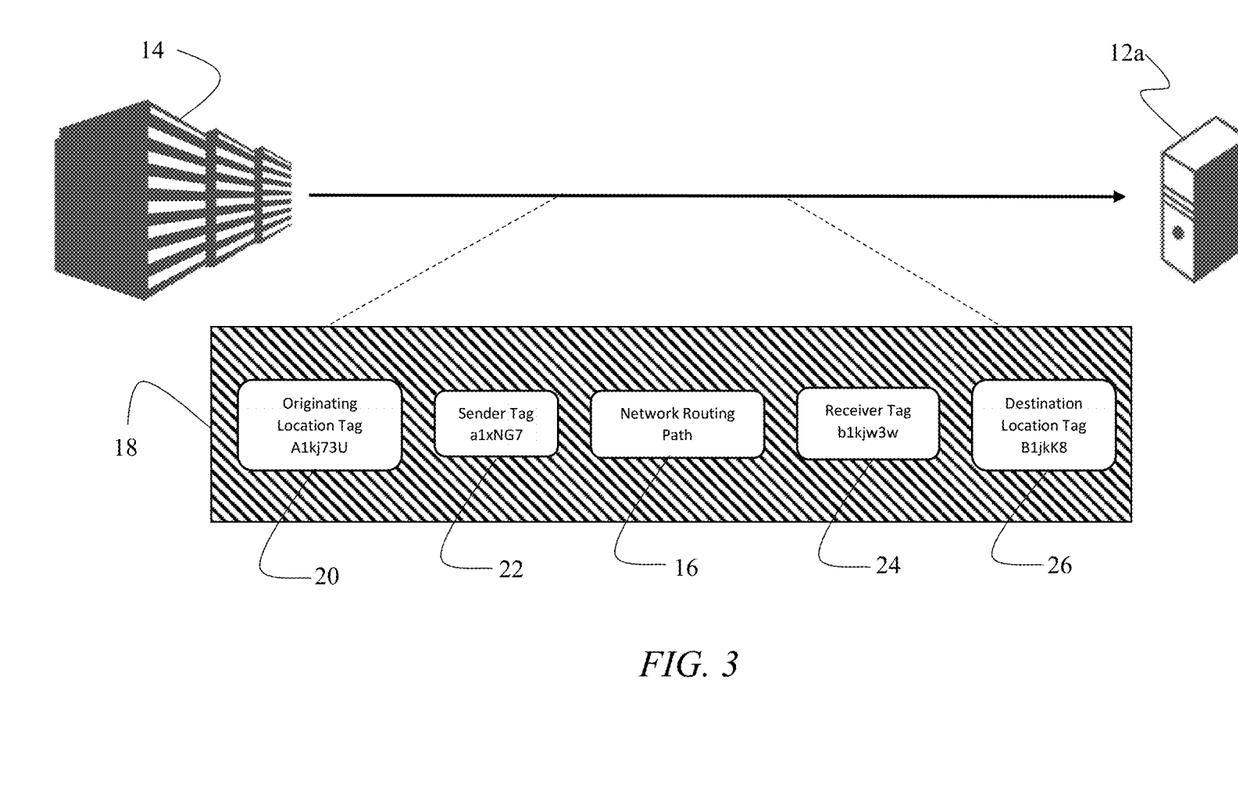
FIG. 3 is a diagram depicting an exemplary processing string being sent from the Processing String Engine to the sending entity.

Next, Processing String Engine 14 generates a processing string 18 specific to the requested message transmission from sending entity 12a to receiving entity 12b. FIG. 3 depicts an exemplary processing string 18. Processing string 18 may include a plurality of alphanumeric strings associated with parameters pertaining to the message transmission. These parameters may include the following: an origination location tag 20 and a sender tag 22 associated with sending entity 12a, the network routing path 16, and a receiver tag 24 and a destination location tag 26 associated with receiving entity 12b. Processing String Engine 14 provides the generated processing string 18 to sending entity 12a.

Figure 4:
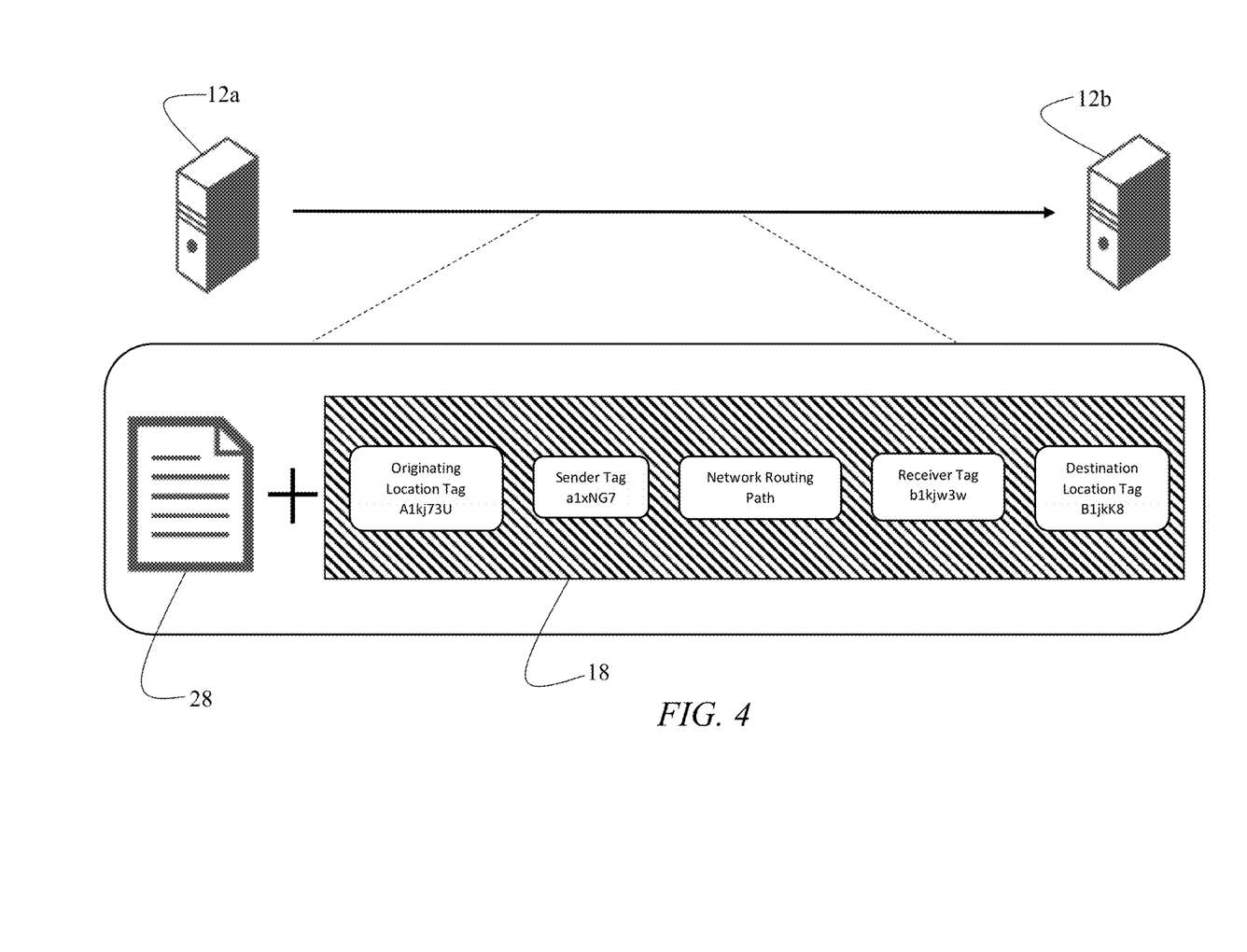
FIG. 4 is a diagram depicting a message with the processing string appended thereto being sent from the sending entity to the receiving entity.

FIG. 4 depicts that upon receipt of processing string 18, sending entity 12a appends processing string 18 to a message 28 and sends message 28 with processing string 18 appended thereto to receiving entity 12b. When processing string 18 is appended to message 28, message 28 becomes unreadable. Thus, in the event that message 28 with appended processing string 18 is intercepted, the intercepting entity will be unable to access the content of message 28. Furthermore, because processing string 18 contains encoded alphanumeric strings as tags for identities and locations of sending entity 12a and receiving entity 12b, processing string 18 does not reveal true identities of sending and receiving entities 12a and 12b nor their locations. Thus, data leakage is meaningless—if this information is discovered by any actor (internal or external), it is rendered null because the sender/receiver/location attributes are unknown. Therefore, risks associated with hacks are mitigated because sender/receiver/location are opaque to the viewer. In this manner, transmission of message 28 is anonymized and, even if message 28 is intercepted, its content and identities and locations of sending and receiving entities 12a and 12b remain concealed.

Figure 5:
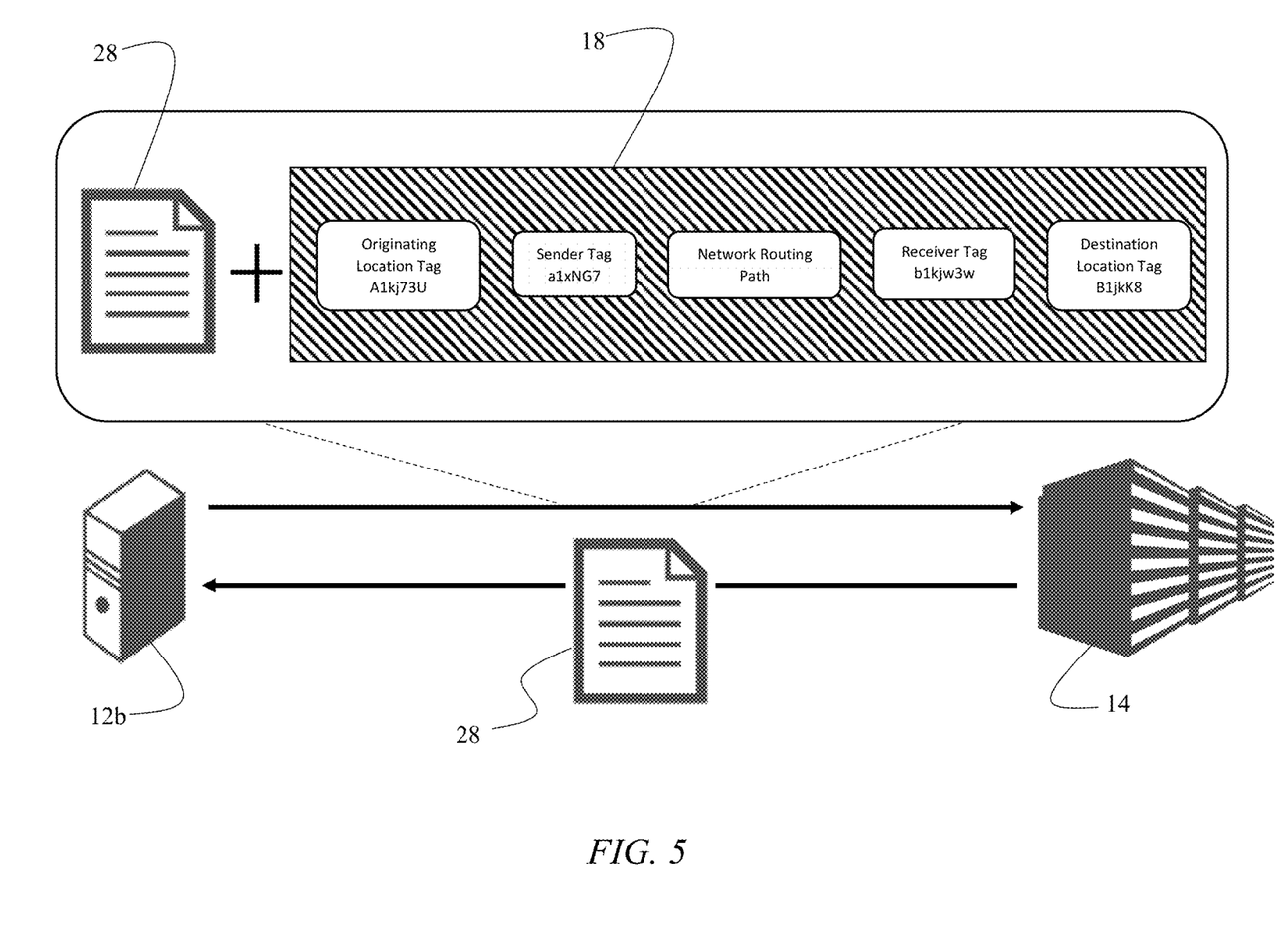
FIG. 5 is a diagram depicting the receiving entity requesting the Processing String Engine to remove the processing string from the message, wherein upon successful verification of the identity of the receiving entity, the Processing String Engine returns the message to the receiving entity without the processing string.

FIG. 5 depicts that upon receipt of message 28 with appended processing string 18, receiving entity 12b cannot immediately access message 28, until processing string 18 is removed. FIG. 5 depicts that receiving entity 12b sends message 28 with appended processing string 18 to Processing String Engine 14, requesting Processing String Engine 14 to remove processing string 18 from message 28. Upon receipt of this request, Processing String Engine 14 verifies that the identity of receiving entity 12b requesting removal of processing string 18 corresponds to the identity of receiving entity encoded in receiver tag 24 within processing string 18. If the verification is successful, Processing String Engine 14 removes processing string 18 from message 28 and transmits message 28 to receiving entity 12b. At this point, receiving entity 12b can access the content of message 28. However, if the verification is not successful—meaning that entity requesting removal of processing string 18 does not correspond to the identity of the intended receiver of message 28 encoded in receiver tag 24—Processing Sting Engine 14 will transmit an alert to sending entity 12a, notifying sending entity 12a that message transmission may have been compromised.

In an embodiment of the invention, to further increase security of message transmission, the following measures may be implemented: alphanumeric strings assigned to origination location tag 20, sender tag 22, receiver tag 24, and destination location tag 26 may be changed after expiration of a predefined duration, for example daily. Furthermore, the same processing string 18 is never used twice, meaning that even if the same sending entity 12a sends a subsequent message to the same receiving entity 12b, Processing String Engine 14 is configured to generate new location tag 20, sender tag 22, receiver tag 24, and/or destination location tag 26. In this manner, even if a message 28 with an appended processing string 18 is intercepted, security of subsequent message transmission will not be compromised because a different processing string 18 will be used.

Figure 6:
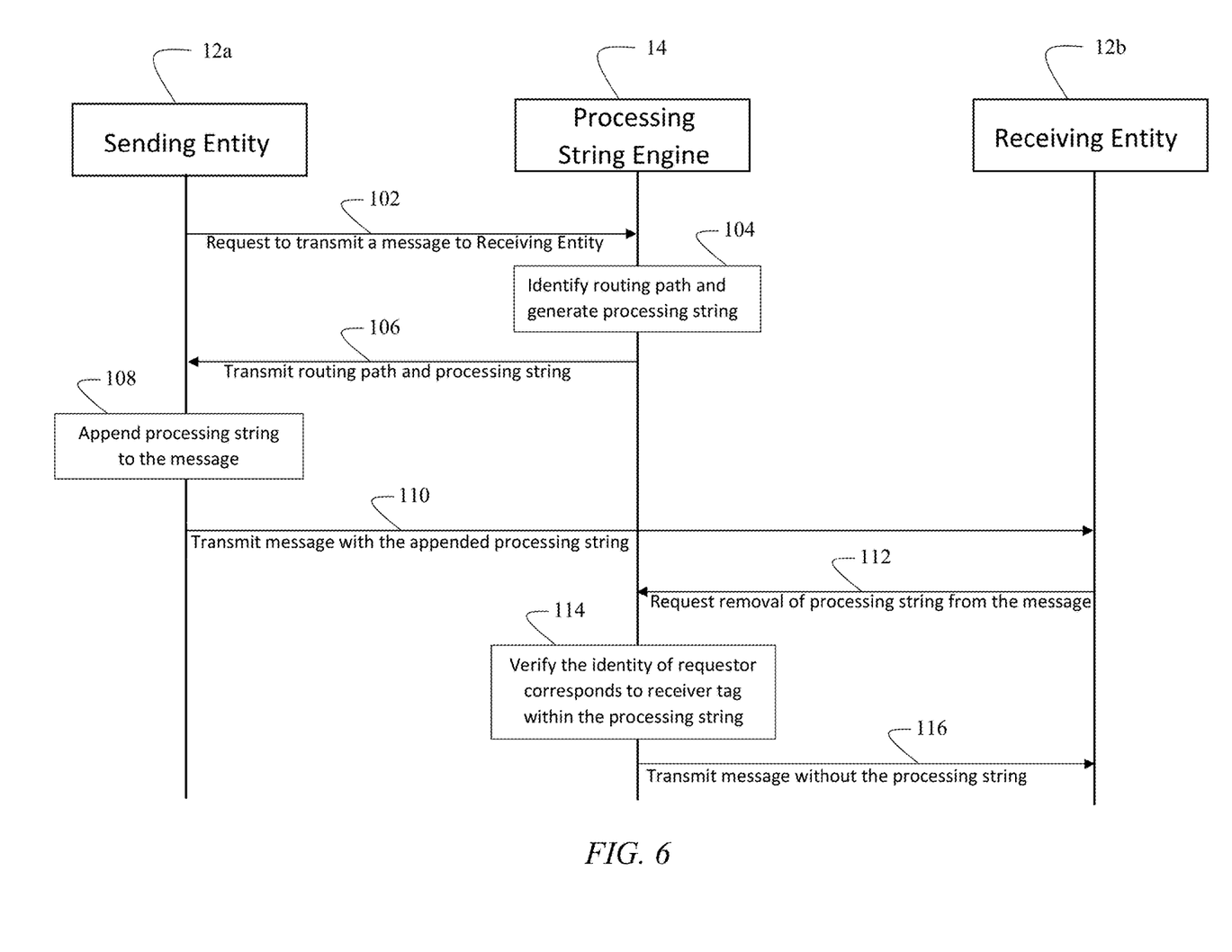
FIG. 6 is a signaling diagram depicting the method of transmitting a message from the sending entity to the receiving entity according to an embodiment of the invention.

FIG. 6 provides a signaling diagram illustrating the method of message transmission described above. In step 102, sending entity 12a sends a request to Processing String Engine 14 requesting to send message 28 to receiving entity 12b. In step 104, Processing String Engine 14 identifies a routing path from sending entity 12a to receiving entity 12b and generates a processing string 18. As explained above, processing string 18 contains a plurality of alphanumeric strings corresponding to location tag 20, sender tag 22, routing path, receiver tag 24, and/or destination location tag 26. In step 106, Processing String Engine 14 transmits processing string 18 to sending entity 12a. In step 108, sending entity 12a appends processing string 18 to message 28. At this point, message 28 becomes unreadable, until Processing String Engine 14 removes processing string 18 from message 28.

FIG. 6 further depicts that, in step 110, sending entity 12a transmits message 28 with appended processing string 18 to receiving entity 12b. This transmission is anonymized because it uses alphanumeric strings generated by Processing String Engine 14 as tags 20, 22, 24, and 26 representing locations and identities of sending entity 12a and receiving entity 12b. Furthermore, message 28 is unreadable when processing string 18 is appended thereto. In this manner, transmission of message 28 is secure because the content of message 28 and the identities and locations of sending and receiving entities 12a and 12b remain concealed, even if message transmission is intercepted.

Next, in step 112, receiving entity 12b sends the received message 28 with appended processing string 18 to Processing String Engine 14 with a request to remove processing string 18. In step 114, Processing String Engine 14 verifies that identity of the entity requesting removal of string 18 matches identity of receiving entity 12b associated with receiver tag 24. Upon successful verification, Processing String Engine 14 removes processing string 18 from message 28 and, in step 116, transmits message 28 back to receiving entity 12b. At this point, receiving entity 28 can access content of message 28. If an unauthorized entity whose identity does not match the identity of receiving entity 12b identified in receiver tag 24 requests Processing String Engine 14 to remove processing string 18 from message 28, Processing String Engine 14 will send a fraud alert to sending entity 12a and/or receiving entity 12b notifying them that the message transmission has been compromised.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of transmitting a message from a sending entity to a receiving entity, comprising:
    providing a Processing String Engine hosted on one or more servers, wherein the sending entity and the receiving entity are communicatively coupled to the Processing String Engine;
    receiving, by the Processing String Engine, a first request from the sending entity to transmit the message to the receiving entity;
    determining, by the Processing String Engine, a network routing path from the sending entity to the receiving entity;
    generating, by the Processing String Engine, a processing string, wherein the processing string comprises one or more alphanumeric strings associated with one or more parameters selected from a group consisting of a location of the sending entity, a sender tag associated with the sending entity, the network routing path, a receiver tag associated with the receiving entity, and a location of the receiving entity;
    transmitting, by the Processing String Engine, the processing string to the sending entity, wherein the sending entity embeds the processing string in the message and sends the message with the processing string embedded therein to the receiving entity via the network routing path determined by the Processing String Engine;
    receiving, by the Processing String Engine, a second request from the receiving entity to remove the processing string from the message, wherein the processing string was generated by the Processing String Engine;
    verifying, by the Processing String Engine, that the receiving entity requesting removal of the processing string corresponds to the receiver tag within the processing string; and responsive to successful verification of the receiving entity, removing the processing string from the message and transmitting the message to the receiving entity.

2. The method of claim 1, wherein while the processing string is embedded in the message, content of the message is unreadable.

3. The method of claim 2, wherein subsequent to removal of the processing string from the message, the receiving entity gains access to the content of the message.

4. The method of claim 1, wherein responsive to unsuccessful verification of the receiving entity, a fraud alert is sent to the sending entity.

5. The method of claim 1, wherein the Processing String Engine has a real-time connection to the sending entity and the receiving entity.

6. The method of claim 1, wherein the one or more alphanumeric strings within the processing string are generated by the Processing String Engine.

7. The method of claim 6, wherein the alphanumeric strings associated with the location of the sending entity, the location of the receiving entity, or both are changed after expiration of a predefined duration.

8. The method of claim 7, wherein subsequent to the expiration of the predefined duration, the alphanumeric strings associated with the location of the sending entity, the location of the receiving entity, or both are not used for subsequent message transmissions.

9. The method of claim 1, wherein the processing string is unique for every message transmission.

10. The method of claim 1, wherein the sender tag, the receiver tag, or both are changed after expiration of a predefined duration.

11. A non-transitory computer-readable storage medium having instructions stored thereon that, when executed by one or more processors facilitates transmission of a message from a sending entity to a receiving entity via a network, the method comprising:
receiving a first request from the sending entity to transmit the message to the receiving entity;
determining a network routing path from the sending entity to the receiving entity;
generating a processing string, wherein the processing string comprises one or more alphanumeric strings associated with one or more parameters selected from a group consisting of a location of the sending entity, a sender tag associated with the sending entity, the network routing path, a receiver tag associated with the receiving entity, and a location of the receiving entity;
transmitting the processing string to the sending entity, wherein the processing string is embedded in the message and the message with the processing string embedded therein is sent to the receiving entity via the network routing path;
receiving a second request from the receiving entity to remove the processing string from the message;
verifying that the receiving entity requesting removal of the processing string corresponds to the receiver tag within the processing string; and
responsive to successful verification of the receiving entity, removing the processing string from the message and transmitting the message to the receiving entity.

12. The non-transitory computer-readable storage medium of claim 11, wherein while the processing string is embedded in the message, content of the message is unreadable.

13. The non-transitory computer-readable storage medium of claim 12, wherein subsequent to removal of the processing string from the message, the receiving entity gains access to the content of the message.

14. The non-transitory computer-readable storage medium of claim 11, wherein responsive to unsuccessful verification of the receiving entity, a fraud alert is sent to the sending entity.

15. The non-transitory computer-readable storage medium of claim 11, wherein the alphanumeric strings for the location of the sending entity, the location of the receiving entity, or both are changed after expiration of a predefined duration.

16. The non-transitory computer-readable storage medium of claim 15, wherein subsequent to expiration of the predefined duration, the alphanumeric strings associated with the location of the sending entity, the location of the receiving entity, or both are not used for subsequent message transmissions.

17. The non-transitory computer-readable storage medium of claim 11, wherein the processing string is unique for every message transmission.

18. The non-transitory computer-readable storage medium of claim 11, wherein the sender tag, the receiver tag, or both are changed after expiration of a predefined duration.

19. The non-transitory computer-readable storage medium of claim 11, wherein the processor is located on a server.

20. The non-transitory computer-readable storage medium of claim 19, wherein the sending entity and the receiving entity have a real-time connection to the server.

* * * * *